Figure 1:
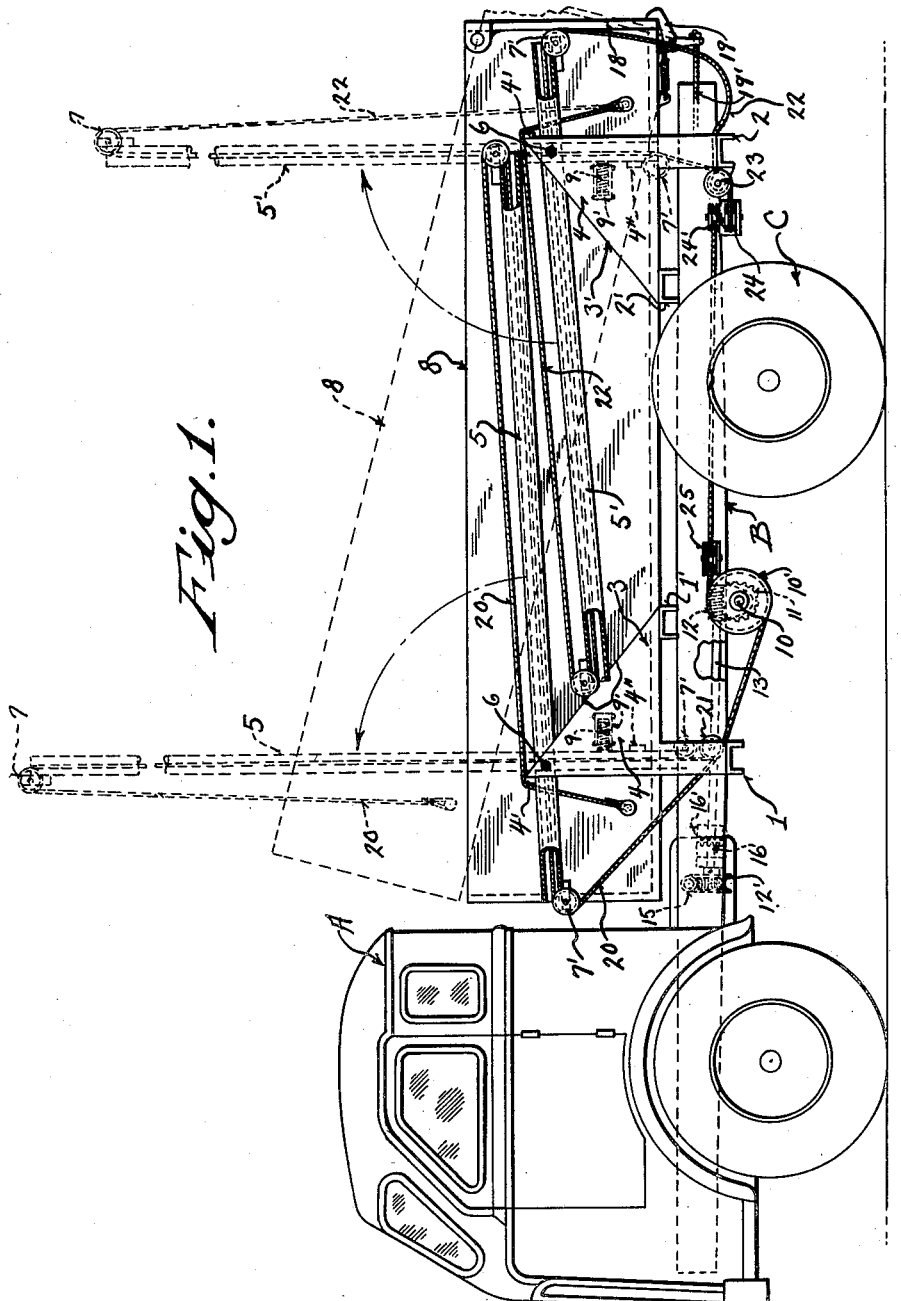

March 7, 1950  C. D. HUGHES  2,499,919
HIGH-LIFT DUMP BODY
Filed Jan. 23, 1948  3 Sheets-Sheet 1

INVENTOR
CECIL D. HUGHES
BY
ATTORNEYS

March 7, 1950 — C. D. HUGHES — 2,499,919
HIGH-LIFT DUMP BODY
Filed Jan. 23, 1948 — 3 Sheets-Sheet 2

INVENTOR
CECIL D. HUGHES
BY
ATTORNEYS

March 7, 1950  C. D. HUGHES  2,499,919
HIGH-LIFT DUMP BODY

Filed Jan. 23, 1948  3 Sheets-Sheet 3

INVENTOR
CECIL D. HUGHES

BY

ATTORNEYS

Patented Mar. 7, 1950

2,499,919

UNITED STATES PATENT OFFICE 2,499,919

HIGH-LIFT DUMP BODY

Cecil Daniel Hughes, Winter Haven, Fla.

Application January 23, 1948, Serial No. 3,981

2 Claims. (Cl. 298—11)

My invention refers to dump body trucks, and it has for its primary object to provide a "high lift," or adjustable dump body, having power actuated cables for suspending the body and positioning the same at a discharging angle, by front and rear pivoted booms associated with the cables, whereby the said body under control of the driver, may simultaneously elevate and rearwardly incline it, at a dumping angle, the load being then discharged by manually tripping a locked tail gate, from the driver's seat.

With the above and other objects in view, which will appear as the description proceeds, the invention resides in the novel construction, combination and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

In the drawings

Figure 1 represents a side elevation of a truck embodying the features of my invention, the same being shown with the body resting upon the truck frame.

Figure 2:
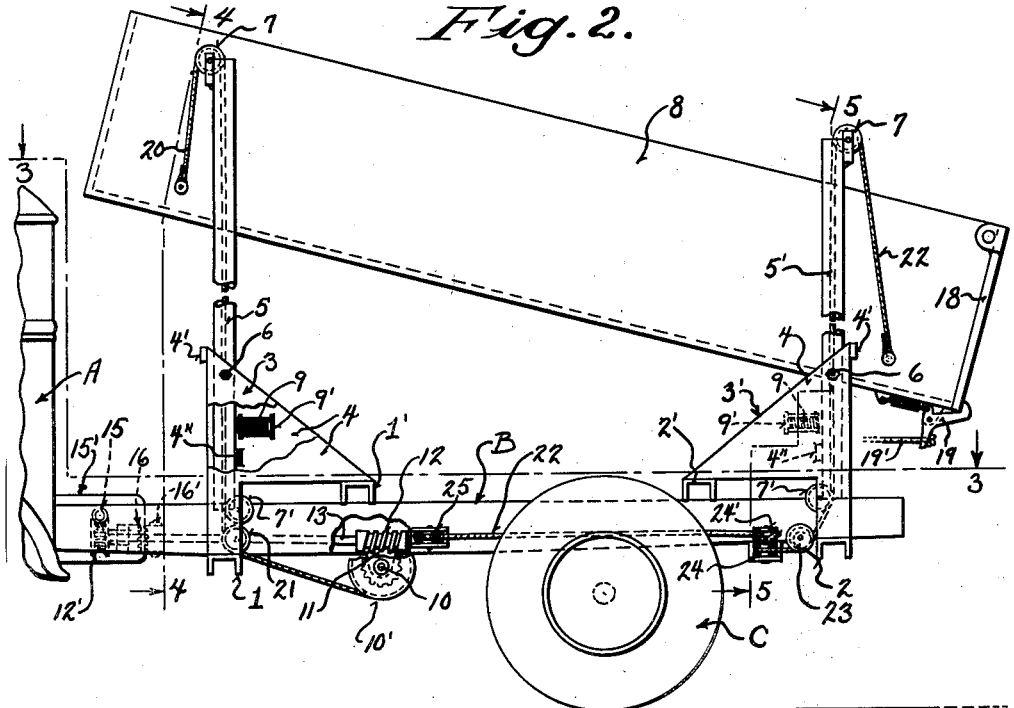

Figure 2, a side elevation of the truck illustrating the body in its elevated and dumping position.

Figure 3:
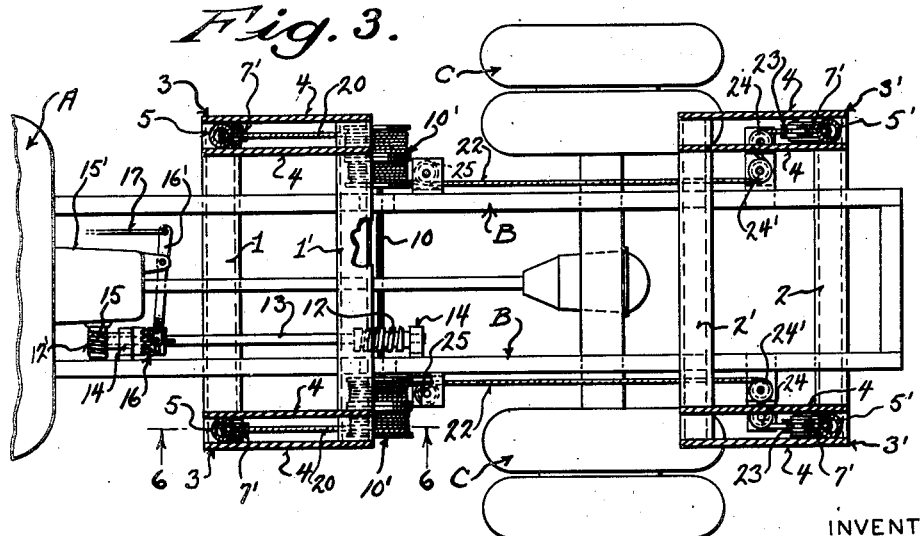

Figure 3, a plan view of the truck partly in section, as illustrated by line 3—3 of Figure 2.

Figure 4:
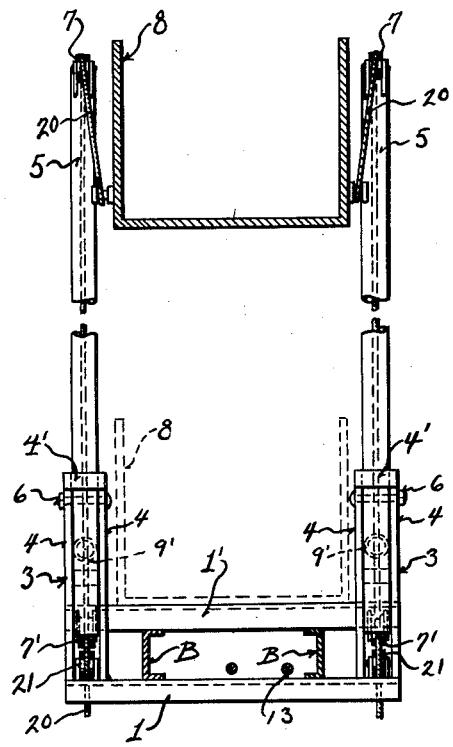

Figure 4, a cross section of the truck, the section being indicated by line 4—4 of Figure 2.

Figure 5:
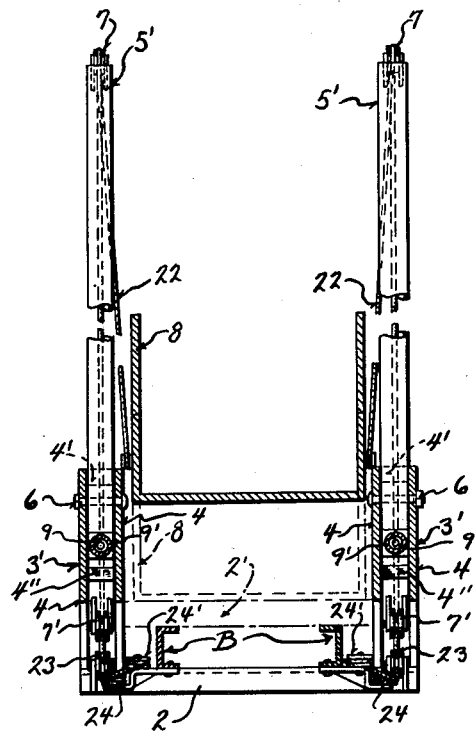

Figure 5, another cross sectional view, the section being indicated by line 5—5 of Figure 2.

Figure 6:
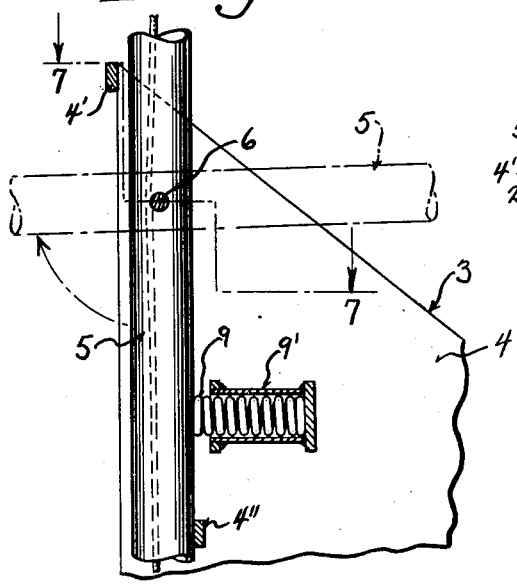
Figure 7:
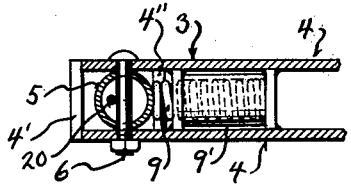
Figure 7:

Figure 6, an enlarged fragmentary sectional elevation illustrating one of the body supporting booms and its associated parts, the section being indicated by line 6—6 of Figure 3, and Figure 7, a plan sectional view of the same, the section being indicated by line 7—7 of Figure 6.

Referring by characters to the drawings, A indicates the cab of the truck and B—B, the chassis, or frame, supported by wheels C, all of which parts are of standard type.

The longitudinally disposed frame members B, are provided with pairs of front and rear angle brace bars 1—1', and 2—2' respectively.

Suitably secured to the pairs of angle brace bars, are front and rear knees 3—3', which knees, for convenience in illustrating, have companion walls 4—4, that serve as housings for same, their upper ends being connected by cross braces 4' and lower stop braces 4".

Companion pairs of front and rear booms 5—5' respectively are secured to the knees, intermediate their ends, by pivot bolts 6. The booms are preferably tubular in form and their upper and lower ends have secured thereto pulleys 7—7'.

As best shown in Figure 2 of the drawings, when the body 8, is in its elevated and discharging position, the pairs of booms 5—5' are in a vertical position with their bottom ends engaging the stops 4". In this position said bottom ends, engage compression springs 9, mounted in, housings 9', secured to the walls of the knees.

Obviously any suitable form of booms may be employed, as for example, the same might be fabricated from angle iron struts.

Suitably journaled in the frame, is a cross shaft 10, which shaft at its ends, has mounted thereon pairs of drum 10', the outer pair, as illustrated in Figure 3, being in alignment with the front knees 3—3.

The drum shaft 10, carries a worm wheel 11, which wheel meshes with a worm 12, mounted upon a power takeoff shaft 13, journaled in ears 14, carried by one of the frame struts B.

The take-off shaft 13, at its forward end, carries a worm wheel 12', which worm wheel is meshed with a worm 15, in gear connection with the transmission gears, mounted in a box 15', that forms part of the driving motor, not shown. The take-off shaft also carries a clutch 16, controlled by a lever 16', which lever is pivoted to the transmission gear box and its upper end is provided with an actuating rod 17, which is directed into the cab, for convenient manipulation.

The body 8, is provided with any type of pivoted tail gate 18, and said gate is locked in its closed position by a spring controlled pivoted dog 19, having a tail, provided with a flexible pull line 19', which is suitably trained and directed into the driver's cab.

The front end of the body 8, has secured thereto a pair of cables 20, which cables are trained over the boom pulleys 7 and thence, downwardly through the booms 5 and over the pulleys 7', as best illustrated in Figure 1 of the drawings.

The cables are then trained under pulleys 21, and from thence rearwardly over the outer drums 10', as best illustrated in Figures 2 and 3.

The rear end of the body 8, has secured thereto a pair of cables 22, which cables are trained over the boom pulleys 7, in a similar manner to that previously described with reference to the front cables. These rear cables from the pulleys 7', are trained over pulleys 23, mounted upon the side struts of the frame B, and thereafter the cable is coiled about a pair of vertically disposed offset pulleys 24—24', which set of pulleys are suitably mounted upon the frame struts. The cables 22, after leaving the pair of vertically disposed guide pulleys, are extended forwardly and trained over frame carried pulleys 25 and from said last mentioned pulleys, the cables are coiled about the inner set of drums.

As illustrated in Figure 1, of the drawings, the truck body is in its normal carrying position, resting upon the frame brace bars 1'—2' and the front and rear booms 5—5' are folded downwardly upon their pivots, in a horizontal position, whereby they are completely out of the way for loading and travel. In this traveling position of the body 8, it will be noted that the rear set of cables 22, are provided with a material slack, while the front cables 20, are practically taut.

From the foregoing description, when it is desired to elevate the body, the clutch lever 16' is actuated to throw the take-off shaft into driving connection. The two sets of cables are then wound upon the drums, and due to the fact that the rear cables are slacked, the front cables will immediately start to lift the body and when the slack in, the rear cables are taken up and they will also start to lift said body, hence, the front portion of the body will be disposed at an angle to the discharge end thereof. Thereafter, the body will be gradually raised to the desired elevation and when said elevation is reached, the driver will trip the tail gate locking dog, whereby said gate will open and deliver the load, which will flow from the body by gravity.

In starting to lower the body to normal position, it will be noted that the coiled springs 9—9 will kick the lower ends of the booms forward and over the dead center, whereby said body will be, gradually lowered to its normal position, as shown in Figure 1, of the drawings.

I claim:

1. In a truck having a motor and transmission gear box, a frame, and a floating body mounted thereon; front and rear pairs of knees extending from the frame encasing the body, pairs of booms pivoted to the knees intermediate their ends, pulleys mounted upon the opposite ends of each boom, a drum shaft journaled in the truck frame, a clutch controlled take-off shaft geared to the motor transmission and drum shaft, guide pulleys mounted upon the truck frame, and front and rear cables secured to the truck body, the same being trained over the boom pulleys, truck frame pulleys and the drum of said shaft.

2. In a truck having a frame and a motor driven geared transmission, a floating body mounted upon a frame, pairs of front and rear booms extending from the frame, pulleys carried by the booms, a shaft journaled in the truck frame, drums carried by the shaft, a power take-off shaft geared to the drum shaft, guide pulleys carried by the truck frame and front and rear cables secured to the truck body, trained over the boom pulleys and truck frame pulleys about the drums.

CECIL DANIEL HUGHES.

REFERENCES CITED

The following references are of record in the file of this patent:

UNITED STATES PATENTS

| Number | Name | Date |
|---|---|---|
| 1,270,120 | Conway | June 18, 1918 |
| 1,823,941 | Hopkins | Sept. 22, 1931 |